(12) United States Patent
Bridgeman et al.

(10) Patent No.: US 11,227,439 B2
(45) Date of Patent: Jan. 18, 2022

(54) SYSTEMS AND METHODS FOR MULTI-USER VIRTUAL REALITY REMOTE TRAINING

(71) Applicant: EON REALITY, INC., Irvine, CA (US)

(72) Inventors: Mark Bridgeman, Macclesfield (GB); Malcolm Collett, Salford (GB); Stephen Andrew Bowden, Worsley (GB); Davey O'Brien, Widnes (GB); Yazhou Huang, Mission Viejo, CA (US)

(73) Assignee: EON REALITY, INC., Irvine, CA (US)

( * ) Notice: Subject to any disclaimer, the term of this patent is extended or adjusted under 35 U.S.C. 154(b) by 289 days.

(21) Appl. No.: 16/366,095

(22) Filed: Mar. 27, 2019

(65) Prior Publication Data
US 2019/0304188 A1 Oct. 3, 2019

Related U.S. Application Data

(60) Provisional application No. 62/650,042, filed on Mar. 29, 2018.

(51) Int. Cl.
*G06T 19/00* (2011.01)
*G09B 19/00* (2006.01)
*G09B 9/00* (2006.01)
*G09B 19/24* (2006.01)

(52) U.S. Cl.
CPC .......... *G06T 19/003* (2013.01); *G06T 19/006* (2013.01); *G09B 9/00* (2013.01); *G09B 19/003* (2013.01); *G06T 2219/024* (2013.01); *G09B 19/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,914,472 | B1 * | 12/2014 | Lee | G06T 19/006 709/219 |
| 10,083,627 | B2 * | 9/2018 | Daniel | G09B 19/24 |
| 10,360,729 | B2 * | 7/2019 | Montgomerie | G09B 5/14 |
| 10,410,542 | B1 * | 9/2019 | Stone | G09B 23/285 |
| 10,762,802 | B2 * | 9/2020 | Wallace | G09B 9/00 |
| 2004/0166484 | A1 * | 8/2004 | Budke | G09B 19/00 434/433 |

(Continued)

*Primary Examiner* — Motilewa Good Johnson
(74) *Attorney, Agent, or Firm* — Innovation Capital Law Group, LLP; Vic Lin

(57) ABSTRACT

Aspects of the disclosure provide remote training in a virtual reality (VR) environment. Multiple users may engage in the session. For example, a trainee may practice or be evaluated in performing a virtual version of a training task. A trainer may join the trainee's session. Embodiments enable the trainer to switch from a third-person perspective viewing the environment to the trainee's first-person perspective to see what the trainee is seeing. Virtual objects may be highlighted to guide the trainee's steps. Some embodiments may configure the training module to be engaged at various points out of order. For example, a user may select a specific point in a training sequence and work from there, replay or forward the environment in time to other points so that the trainee can skip or practice parts of the procedure.

20 Claims, 11 Drawing Sheets

(56) References Cited

U.S. PATENT DOCUMENTS

| | | | |
|---|---|---|---|
| 2015/0379894 A1* | 12/2015 | Becker | G09B 19/24 |
| | | | 219/124.1 |
| 2016/0125594 A1* | 5/2016 | Becker | B23K 9/0953 |
| | | | 348/90 |
| 2016/0291922 A1* | 10/2016 | Montgomerie | G09B 5/125 |
| 2016/0358383 A1* | 12/2016 | Gauglitz | G06T 19/006 |
| 2018/0293802 A1* | 10/2018 | Hendricks | G09B 23/30 |
| 2019/0392728 A1* | 12/2019 | Pike | G06F 3/011 |
| 2021/0264810 A1* | 8/2021 | Johnson | G09B 9/00 |

\* cited by examiner

SYSTEMS AND METHODS FOR MULTI-USER VIRTUAL REALITY REMOTE TRAINING

CROSS-REFERENCE TO RELATED APPLICATION

This application claims benefit under 35 U.S.C. § 119(e) of U.S. Provisional Application having Ser. No. 62/650,042 filed Mar. 29, 2018, which is hereby incorporated by reference herein in its entirety.

FIELD OF THE INVENTION

The present invention relates in general to virtual reality systems and methods. More particularly, the invention is directed to systems and methods for multi-user virtual reality remote training.

BACKGROUND OF THE INVENTION

There exist virtual reality (VR) training applications on the market, however typically only a single user is accommodated for the training process. The conventional VR training experience usually consists of static step-by-step routines that the user must follow while engaged in a VR world. The user is typically required to go through a preset training routine following a preprogrammed order of actions. Some existing multi-user VR training applications may support more than one user; however, each user's view is limited to his own perspective.

Accordingly, a need exists to provide more user flexibility and training aids to provide a good solution to address the problems above.

SUMMARY OF THE INVENTION

In the first aspect, a system for multi-user virtual reality (VR) remote training comprises: a server computer configured to: generate a VR simulated environment in response to a selection of a stored VR training module, and coordinate changes in the VR simulated environment in response to user actions in the VR simulated environment; a VR device in communication with the server computer, wherein the generated VR simulated environment is displayed to a first user through the VR device; and a computing device in communication with the computer server, wherein a second user is connectable, through the computing device, to a session displaying the first user in the generated simulated environment, and wherein the second user is enabled to switch between a third person perspective view of the VR simulated environment watching the first user to a first-person perspective view of the VR simulated environment, as viewable by the first user.

In a second aspect, a computer program product for multi-user virtual reality (VR) remote training comprises a non-transitory computer readable storage medium having computer readable program code embodied therewith. The computer readable program code is configured to: generate a VR simulated environment in response to a selection of a stored VR training module, wherein the stored VR training module includes virtual objects and stored operating procedures related to the virtual objects; coordinate changes in the VR simulated environment in response to user actions in the VR simulated environment; display to a first user through a VR device, the generated VR simulated environment; and display the first user in the generated VR simulated environment to a second user joining a session of the VR simulated environment through a computing device; enable, for the second user, switching between a third person perspective view of the VR simulated environment watching the first user to a first-person perspective view of the VR simulated environment, as viewable by the first user.

In a third aspect, a method of providing a multi-user virtual reality (VR) remote training session comprises: generating a VR simulated environment in response to a selection of a stored VR training module, wherein the stored VR training module includes virtual objects and stored operating procedures related to the virtual objects; coordinating changes in the VR simulated environment in response to user actions in the VR simulated environment; displaying to a first user through a VR device, the generated VR simulated environment; displaying the first user in the generated VR simulated environment to a second user joining a session of the VR simulated environment through a computing device; and enabling, for the second user, switching between a third person perspective view of the VR simulated environment watching the first user to a first-person perspective view of the VR simulated environment, as viewable by the first user.

These and other features and advantages of the invention will become more apparent with a description of preferred embodiments in reference to the associated drawings.

DETAILED DESCRIPTION OF THE PREFERRED EMBODIMENTS

Figure 1:
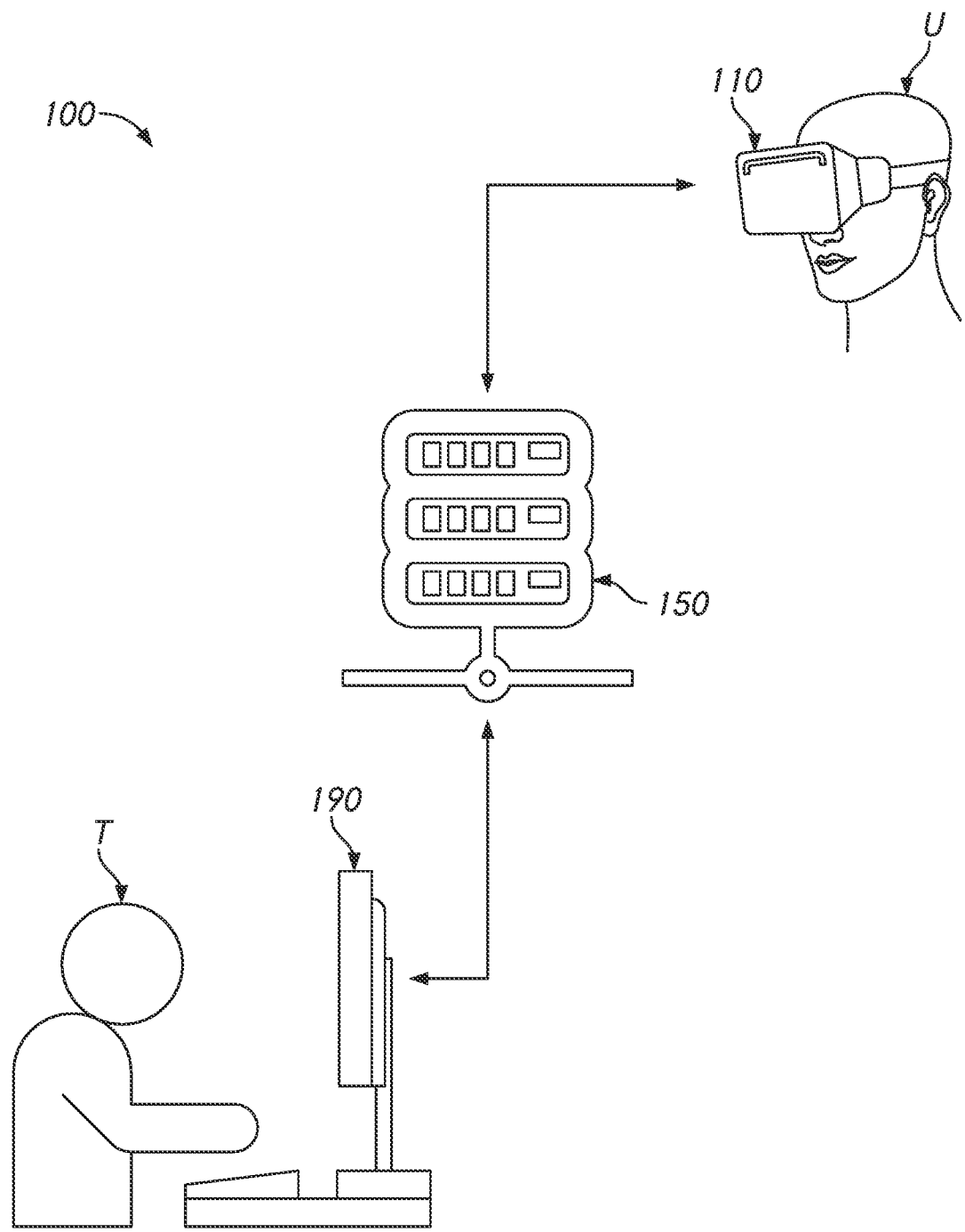
FIG. 1 is a block diagram of a system for multi-user virtual reality remote training in accordance with an exemplary embodiment of the subject technology.

The following embodiments, in general, are directed to remote training tools primarily in virtual reality (VR) environments. It will be appreciated that there are challenges in facilitating efficient and effective hands-on training of a particular task or procedure by using VR technologies. Many VR features are stand-alone and require specialized programming for their own operation. It may be especially challenging to integrate some VR features that may be helpful to train employees into legacy systems that were not originally built with VR in mind.

At present there are no known products in the marketplace that can tie a virtual scene to courseware being populated by a learning management system (LMS) nor does there appear to be any system that can integrate with a legacy system (for example, SAP, Oracle, Customer Relationship Management (CRM) or Enterprise Relationship Planning (ERP) software). For the first time, the unique connectivity and integration features offered by our system allow all relevant training areas to be connected and automated to complete a training cycle. This can be utilized for various scenarios from employee review to setting up training, to contacting an employee for training, to executing the training and recording the results of that training.

Aspects of the embodiments disclosed below integrate various features into a fully immersive VR training platform, including multi-user interactions, real-time voice and/or video communication, a learning management system (LMS), and visual and audio guidance for performing each step of the training procedure. All outcomes may be digitally captured and sent to a Learning Record Store (LRS) system, which tracks a trainee's performance.

In comparison, many prior VR training approaches merely provide a simulated world with interactive buttons or levers that the user virtually clicks to activate in a predetermined sequence. Aspects of the current disclosure improve on this type of approach by creating a fully immersive world where the trainee user can engage with the world as if he or she were actually on-site performing a task (for example, grasping objects, using a tool to open/close a valve as if the user were physically opening/closing the valve, carrying objects from one place to another, etc.). If a user's movement/action is not being performed correctly, the system may track the specific movements so that the trainee and trainer can review what went wrong. In addition, the trainer can enter the trainee's simulated environment at the same time as the trainee but from a remote location so that training can be provided regardless of the trainer and trainee's respective current physical locations in the real world.

As will be appreciated, aspects of the embodiments disclosed provide advantages over previous VR training tools. For example, in some embodiments, multiple users may engage in the same simulated environment. A user may switch between a third person perspective and a first-person perspective. In some embodiments, a user may share the same perspective as the other user while the other user is engaged in the simulated environment. As will be appreciated, this allows for example, a trainer to switch between an observer's perspective to the trainee's perspective so that the trainer can see exactly what the trainee sees and understand any impediments to the trainee's session. In addition, the trainer may be able to virtually "hold the trainee's hand" by pointing to elements in the simulated environment from the shared perspective that the trainee may be overlooking.

In other aspects, embodiments may include virtual tools in the simulated environment which may aid the trainee during a training session. The virtual tools may be objects that includes features such as highlighting for ease of identification, pop-up windows that may be triggered by completing an action or by user selection, and a virtual manual which the user may access to review procedures for a task while remaining immersed in the simulated environment.

In another aspect, a VR training module may be modular. In some embodiments, a training module may be segmented. The user may enter a training module at different points of the procedure. The simulated environment may be displayed at different points of a task and the user may jump ahead or back to a certain step or stage without following the predetermined order of the training module procedure.

As used below, a "user interface" may refer to a software embodiment tool through which users access training modules and virtual scenes. A "user interface" may display for example, different menus, controllable components, and virtual scenes based on user triggered selections. Thus, the same reference numeral may be used to denote a "user interface" in general even though the content between different figures may differ.

Referring now to FIG. 1, a system 100 is shown according to an exemplary embodiment. The system 100 is generally configured to generate a VR training session for a trainee user "U". The VR training session may simulate a real-world environment in which the trainee user "U" expects to perform a work-related task or series of tasks associated with a procedure. Examples of simulated environments are shown below in FIGS. 6-8. A simulated environment may generate objects to be worked on or manipulated by the trainee user "U". In an exemplary embodiment, the trainee user "U" may be free to move about the simulated environment without restriction and may perform actions or tasks free from a predetermined or programmed order so that the user can learn from engaging in improper procedure. Thus, while description below may include features which show a manual of correct steps in a procedure and hints about what to do next under a correct procedure, the trainee user "U" may engage in experimentative actions which may result in unexpected results.

The system 100 may include a VR module 110 and a remote computing device 190 connected to a VR training module through a network server 150. The VR module 110 is worn and operated by a trainee user "U". The VR module 110 may be for example, a headset or other VR device. The module 110 may also be an Augmented Reality device and/or a Mixed Reality (MR) device capable of displaying a VR image superimposed on the physical environment. Generally, the VR module 110 may be configured for a fully immersive VR experience. The computing device 190 may be another VR module for an immersive VR connection to a training session or may be a desktop, laptop, or similar computing device with a digital display that shows the trainee's VR based training session but not necessarily in an immersive capacity. A trainer user "T" may engage the simulated environment from the computing device 190.

The network server 150 may store training modules and generate the simulated environments for training sessions. The trainee user "U" may engage the system 100 through the VR module 110 which may trigger a VR user interface (UI) 120. See FIG. 5. From the UI 120, the trainee user "U" may select from a plurality of training modules to initiate a virtual session. Once a training module is selected, the server 150 may register trainee user "U" actions and may generate responses within the simulated environment based on the trainee's actions. In some embodiments, trainee actions may determine how parts of the simulated environment may change as a training procedure is carried out. The server 150 generally records all actions for a session which may be archived for assessment and review. In some embodiments, the server 150 may permit user's entry into the simulated environment at different points along a procedure with assumptions that the actions prior to that entry point have been in accordance with the correct procedure. In some embodiments, a virtual session may be customized with different starting criteria entered so that the simulated environment may be observed and interacted with under an experiment or to train the trainee in troubleshooting by backtracking through steps to identify the root of a problem. The server 150 may save user's progress at any time in the middle of a training session and resume the training session when the user is ready to continue.

In setting up the network server 150, traditional training material (for example, a company's texts, operation and service manuals, lectures, videos, etc.) may be converted into digital files. The digital file information may be used to generate a detailed three-dimensional model of a working environment which may be used inside a VR environment. As a result, the VR training environment is essentially an exact replica of the physical training environment.

Next, a training procedure may be broken down into step-by-step subtasks. Each subtask may be programmed with corresponding virtual objects inside the VR environment. The virtual objects may be interactive. For example, when a manual includes an instruction to "remove oil pan from the transmission", the simulated environment is programmed so that the oil pan and associated screws may be interacted with by the trainee user "U" to literally unfasten the screws and remove the oil pan with a hand-held interactive controller, as if the trainee were doing so inside a real-world training environment.

Visual and audio instructions may be programmed for each subtask one by one which would help the trainee identify the corresponding object and complete a subtask. For example, the object may be highlighted and/or animated, a text box or a video/animation snippet of the subtask may be shown close by, with an arrow pointing to the object (see for example, FIG. 7), and/or a voice-over may be played in the background detailing the subtask. The progress of the subtasks may be recorded by a Learning Management System (LMS) which tracks each and every subtask performed by the user.

In an exemplary embodiment, multi-user components may be included with the software application. The trainer and trainee each running his/her own version of the application are connected via a network server 150. Trainer and trainee may be fully immersed inside the shared VR environment, or one user may be running the application on a conventional computer monitor or a hand-held device without the virtual reality headset. Typically, the trainee wears a virtual reality headset to be fully immersed in the shared VR environment. Certain features can be seen in FIG. 6 (trainer's view) and FIG. 7 and FIG. 8 (trainee's view).

Figure 9:
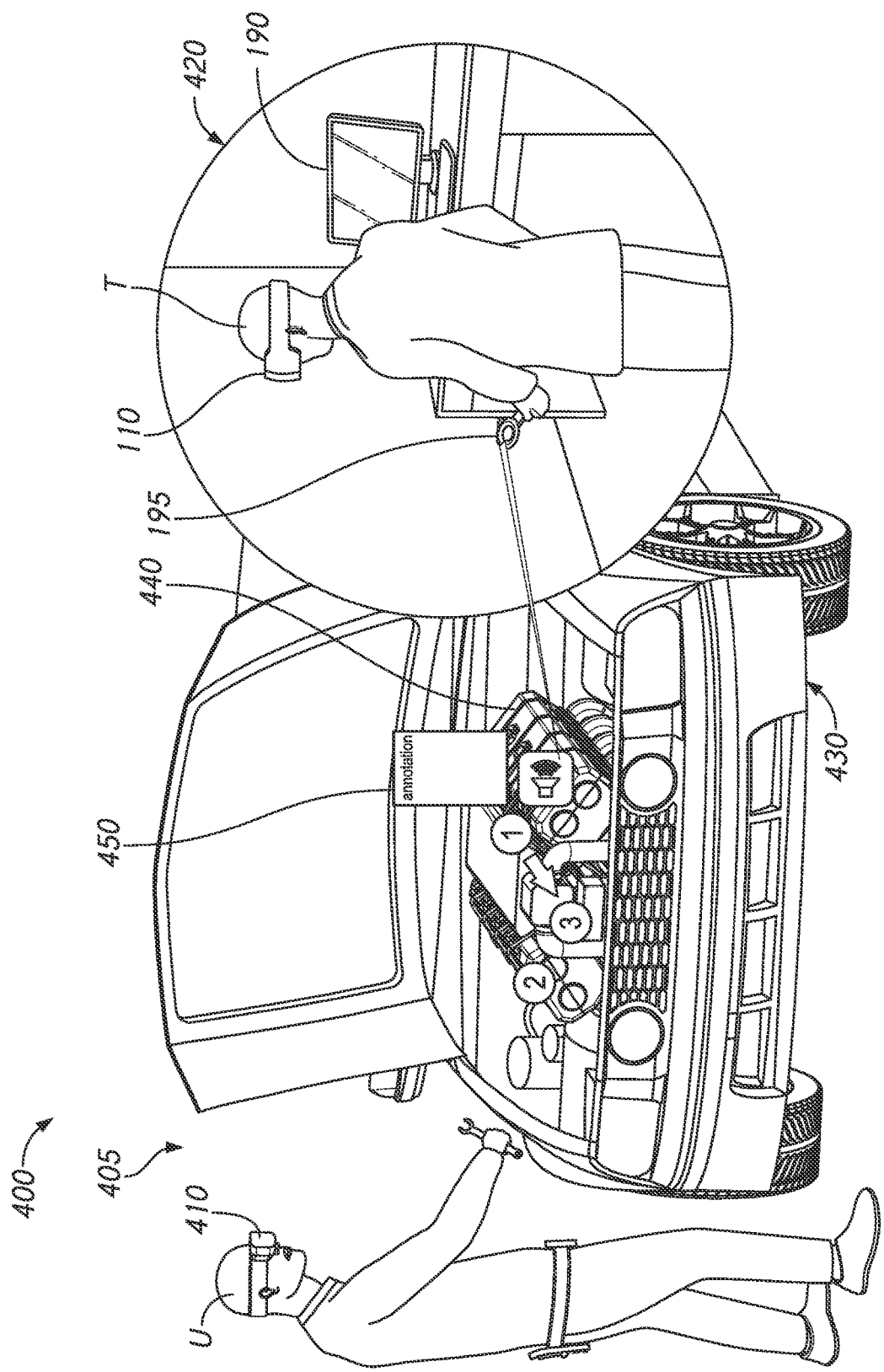
FIG. 9 illustrates a trainee user interacting with an augmented reality scene while a trainer user interacts with the scene remotely in accordance with an exemplary embodiment.

In another exemplary embodiment illustrated in FIG. 9, a trainee user may be wearing a pair of augmented reality (AR) glasses capable of superimposing virtual imagery on top of the physical environment information as part of the training scenario. A trainer user may be wearing a VR module to guide the trainee user through the training procedures. In this exemplary embodiment, the physical environment may include a piece of equipment (for example, an engine 440 of a vehicle as shown in FIG. 9) and the surrounding objects; the superimposed information may include a digital note associated with the equipment. At the same time, a trainer user may be wearing a VR headset fully immersed inside a shared VR environment, which may include a digital replica of the actual equipment that the trainee user sees, along with associated digital notes. The trainer user may interact with the digital replica using a hand-held controller 195 or his/her hand, giving remote guidance to the trainee user within the VR environment, while the trainee user may follow the guidance of the trainer user and directly perform a task on the actual physical equipment. The trainee user's view may be captured via a video camera module on the AR glasses and transmitted in real-time to the trainer user. The trainee user and the trainer use may engage in two-way voice communication.

Figure 2:
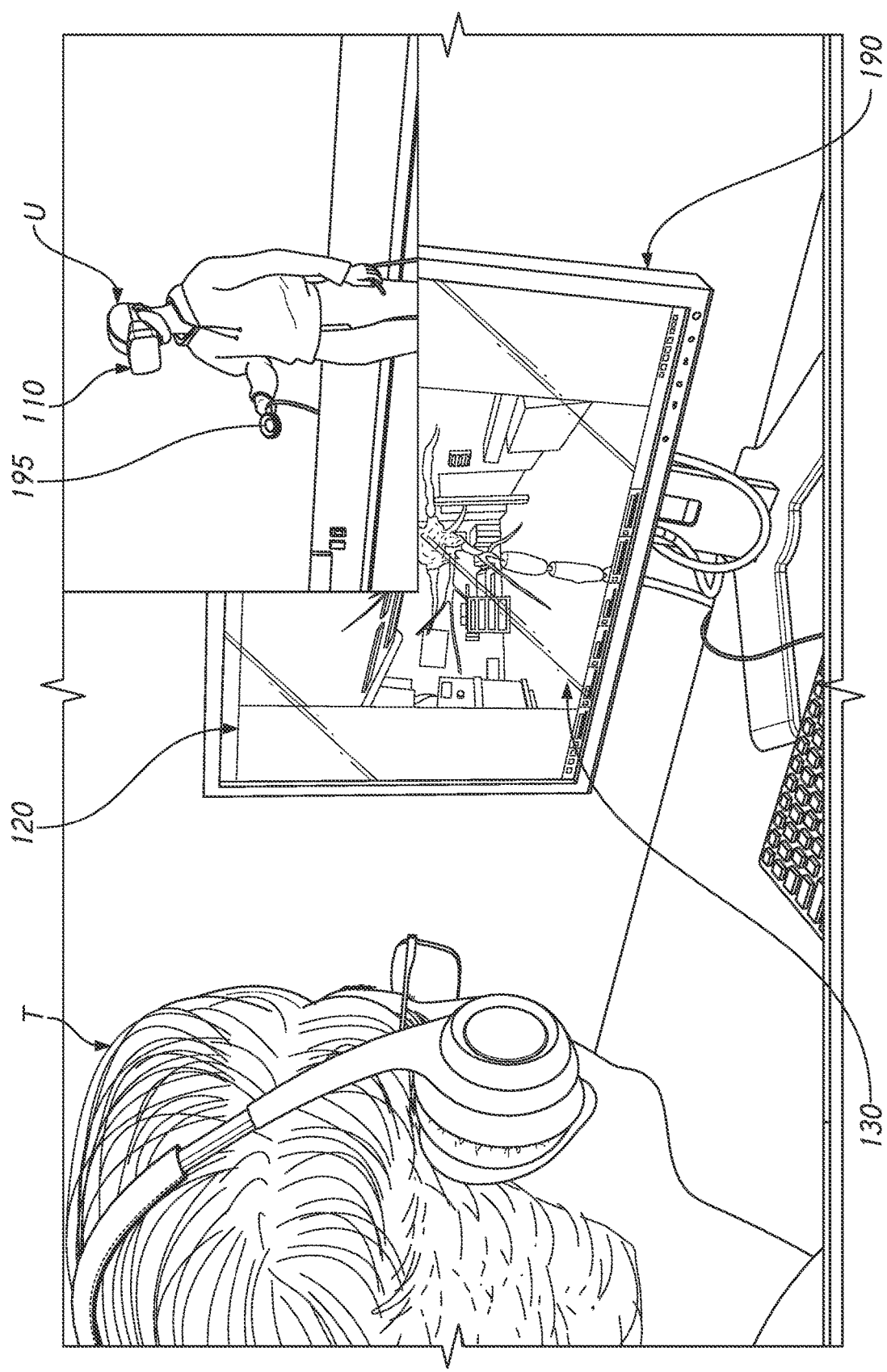
FIG. 2 is a pictorial view showing the user and trainer of FIG. 1 engaged in a multi-user virtual reality remote training session from different locations.

Referring now to FIG. 2, a trainee user "U" is shown in real-life operating the VR module 110 within a virtual training session. The trainee user "U" is at one physical location. A trainer user "T" is at another physical location remote from the trainee user "U" observing and instructing the trainee user "U" as needed. In this example, the trainee user "U" is fully immersed within the simulated environment 130. The trainer user "T" is not fully immersed since their computing device 190 uses a two-dimensional display. When the trainee user "U" is engaged in a virtual training session, the trainee user "U" is generally moving through the simulated world from a first-person perspective. In FIG. 2, the trainee user's perspective can be seen from the trainer user "T"'s computing device 190. The trainer user "T" may operate the UI 120 to switch between a third person perspective observing the trainee user "U"'s actions in the simulated environment 130 to the first-person perspective of the simulated environment 130 as seen by the trainee user "U". Trainer and trainee can see each other's actions. Virtual avatars may be utilized to represent each user. The trainer and trainee can also talk to each other with real-time voice communication. The trainer user "T" can monitor trainee's progress and can step in or be asked to help the trainee on a particular subtask, for example by controlling the visual and/or audio instructions as hints, or directly performing the task using a computer mouse and/or keyboard, a touch screen of a hand-held device, a hand-held interactive controller 195, his/her hand that is tracked in real-time by a wearable device. The trainer user "T" may control the flow of the training procedure by triggering rewind, repeat or fast-forward commands on the list of subtasks to be performed. The trainee user "U"'s progress may be automatically saved on the backend servers 150, and the training session can be resumed at any time on any supported devices that are connected to the backend servers 150.

Figure 3:
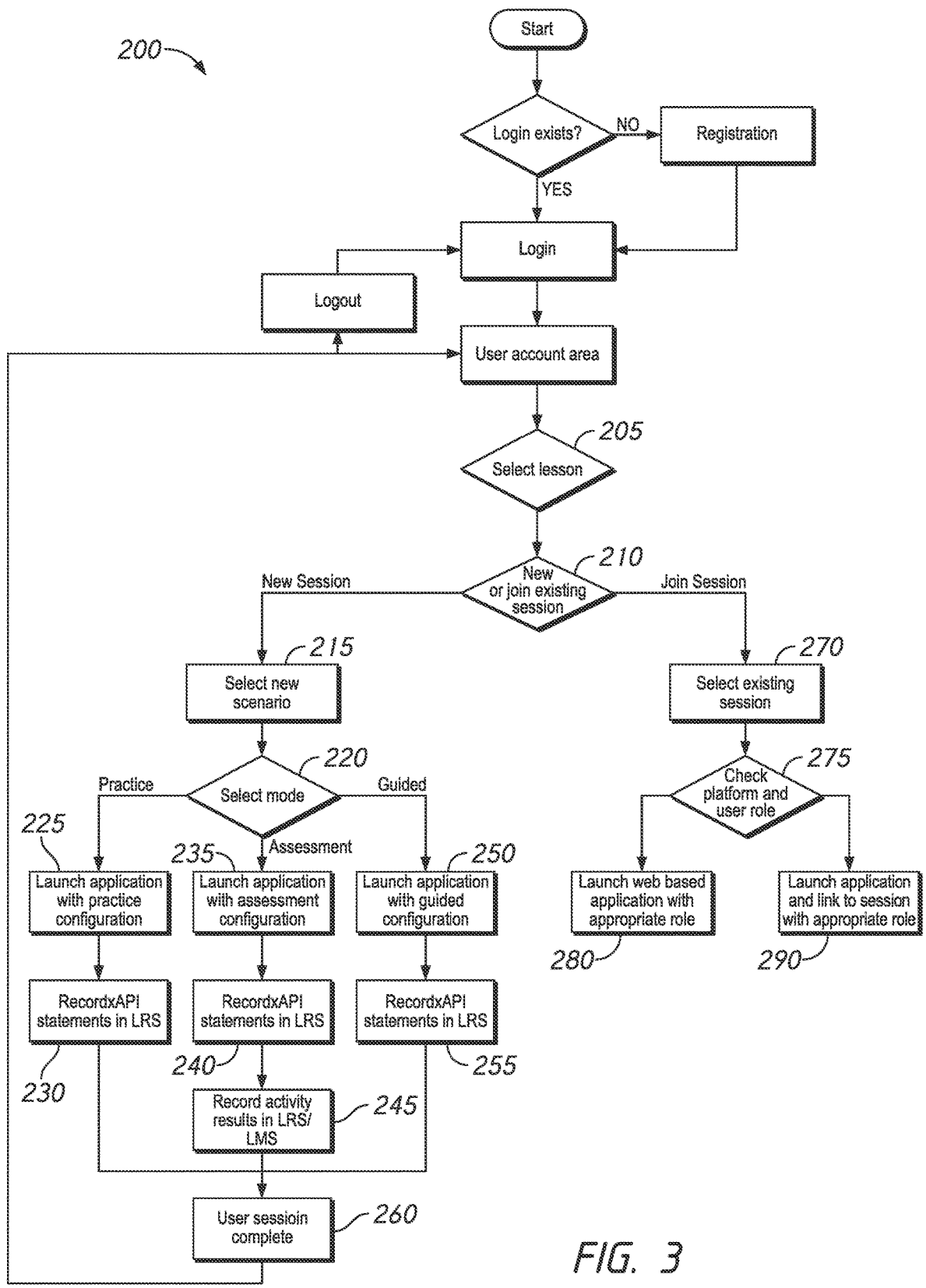
FIG. 3 is a flowchart of a method of operating a virtual reality remote training session in accordance with an exemplary embodiment.
Figure 5:
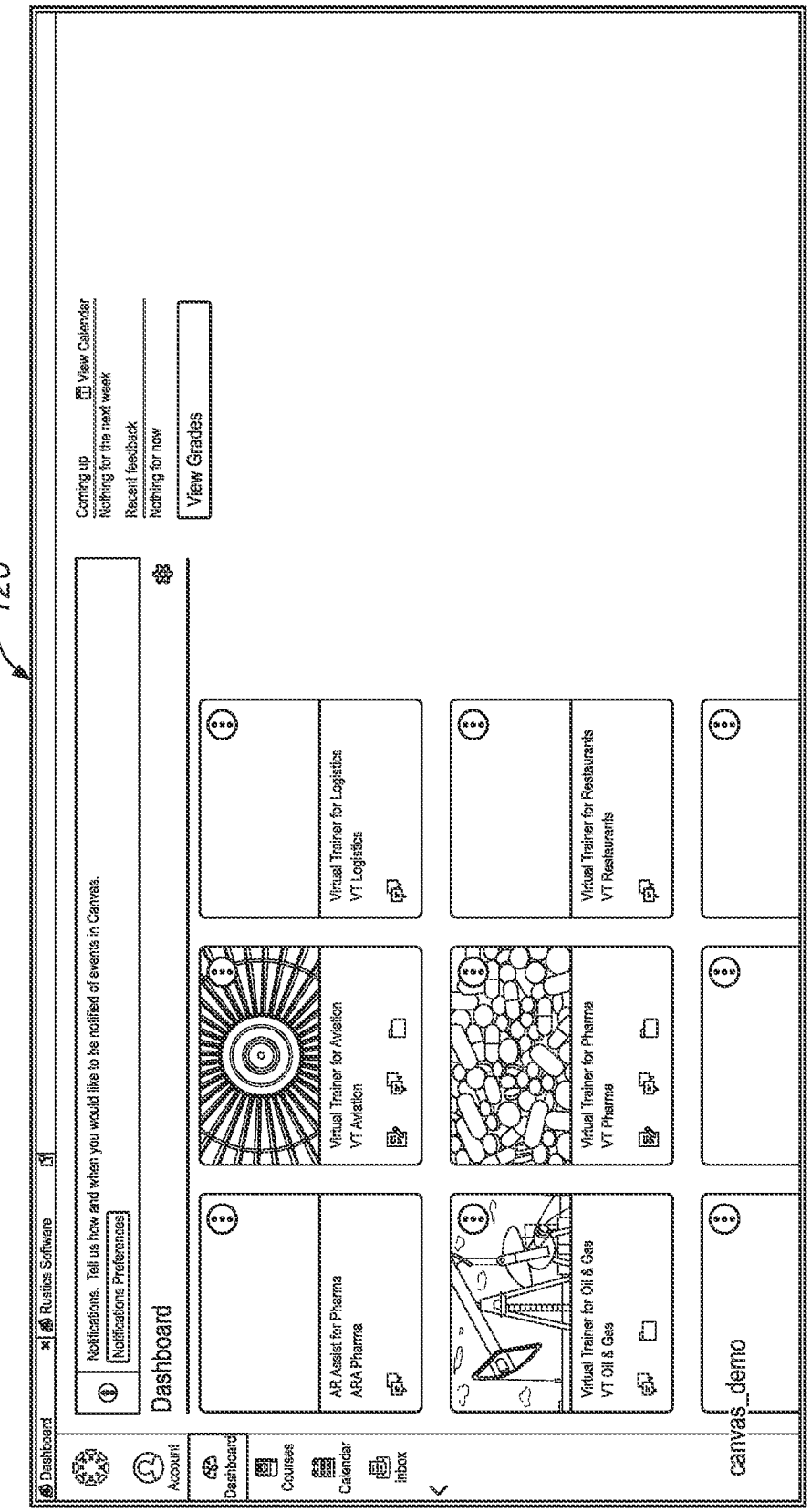
FIG. 5 is a screenshot of a user interface displaying options for different types of virtual reality training sessions in accordance with an exemplary embodiment.

Referring now to FIG. 3, a method 200 of operating a virtual reality remote training session is shown according to an exemplary embodiment. The method 200 may represent aspect configurations of the system in a software application embodiment. The method 200 may represent the steps encountered by any user (whether a trainee, trainer or third-party observer) and as such, the steps below may refer to a "user" in general unless otherwise noted. The user account type and hardware platform determine the role (for example, trainer or trainee). The user may select 205 a session lesson. The user may select whether the selected lesson will be part of a new virtual session or part of an existing session (which maybe for example, a session where only part of the lesson was performed and thus is not finished). In other embodiments, block 210 may represent where one of the users (for example, a trainee, has started a session and the trainer has the option to join in to the trainee's started session. However, it will be understood that the sequence may operate vice versa where the trainer may start the session and the trainee joins in. For a new lesson, the user may select 215 from a list of scenarios to train. FIG. 5 shows an exemplary UI 120 with a list of example scenarios to choose from. The user may select 220 a mode to train in. For example, the system may be configured for either a practice mode, an assessment mode, or a guided mode.

In practice mode, the user may launch 225 the virtual application with a practice configuration. As the user engages with the simulated environment, user actions may be recorded 230.

In assessment mode, the user may launch 235 the virtual application with an assessment configuration. As the user engages with the simulated environment, user actions may be recorded 240. Since the user is in an assessment mode, actions may be used to determine scoring to evaluate whether the user performs well enough in the selected simulated environment and procedure. The results may be recorded 245 for evaluation. In some embodiments, at the end of the training session, the results may be automatically tabulated and a final score or determination of pass/fail may be generated.

In guided mode, the user may launch 250 the virtual application with a guided configuration. A guided configuration may include features or objects which automatically display themselves, highlight themselves, or otherwise draw the user's attention to the next step to be performed. As the user engages with the simulated environment, user actions may be recorded 255.

For users that join into an existing session, the user may select 270 an existing session. In some cases, the user is selecting a session where he or she is paired up with another user that has already initiated the session. The system may determine the user's role in the training session; for example, as a trainee, a trainer, or a third-party observer. For example, a trainer may typically launch 280 a Web based application which may be configured for the trainer's view running inside a web browser on a desktop computer or a hand-held device. Likewise, a third-party observer may also interface via a Web based application. Otherwise, the user may launch 290 the virtual training application through a VR or AR module and link onto the existing session.

Figure 4:
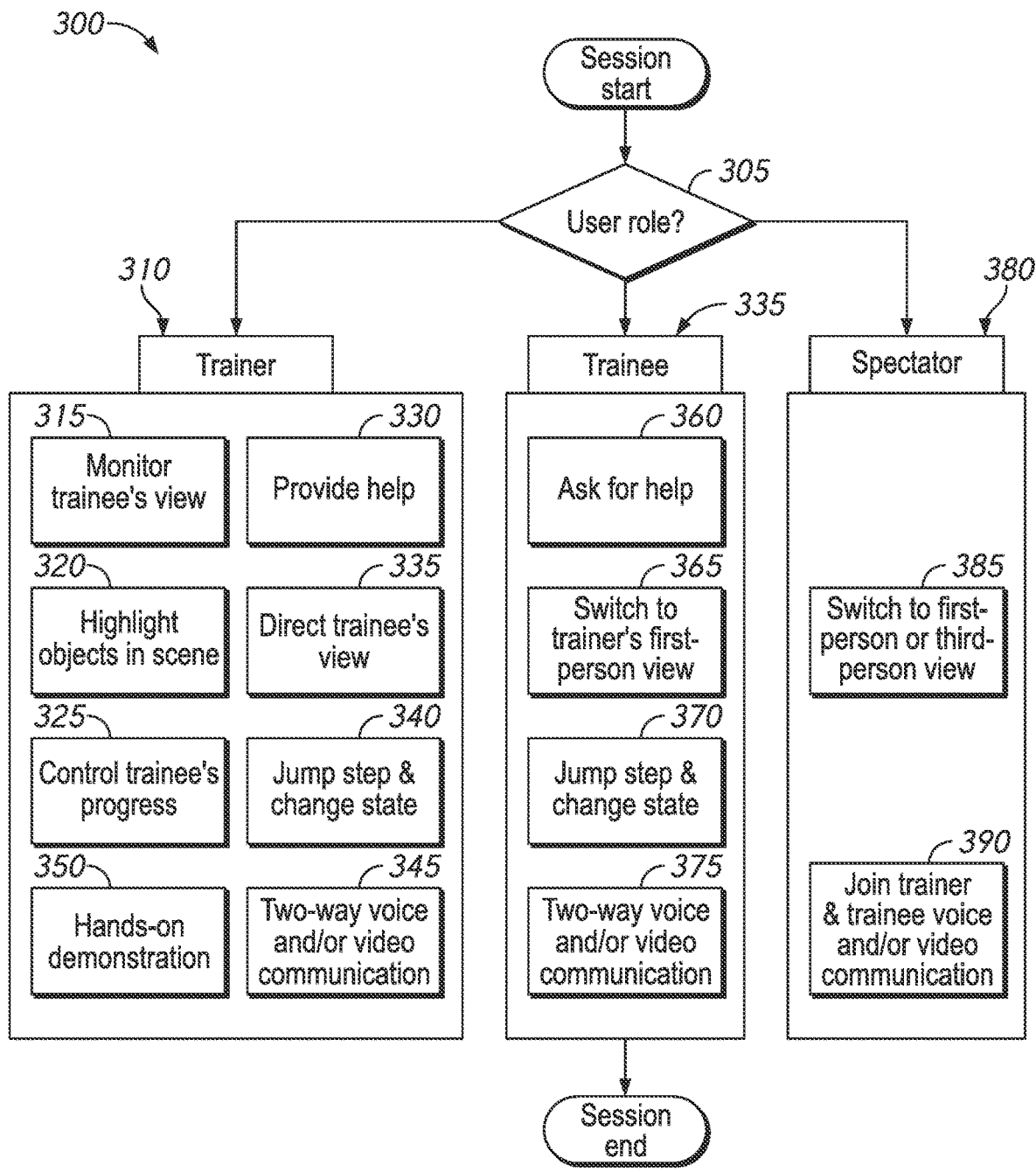
FIG. 4 is a flowchart of a method of operating a virtual reality remote training session based on user role in accordance with an embodiment.

Referring now to FIG. 4, a method 300 of operating a virtual reality remote training session based on user role is shown according to an exemplary embodiment. The system may determine 305 which role a user has when trying to access the system. Generally, three different modules may exist which may determine what features to be made available in the operation of the system: a trainer module 310, a trainee module 335, a spectator module 380.

The trainer may monitor 315 and direct trainee's view. For example, the trainer may trigger a function highlighting 320 an object to direct the trainee's attention to the object. If the trainee gets lost, some embodiments may include a function triggerable by the trainer to position the trainee (or his/her view) right in front of the object. The trainer may control 325 trainee's progress. For example, the trainer may control jumping forward/backward on the list of subtasks performed; if the trainee is stuck on a particular subtask and couldn't advance, the trainer may override to skip the subtask; the trainer may let the trainee repeatedly practice a certain subtask; the trainer may skip certain subtasks if the trainee is overly familiar with them.

FIG. 5 is a screenshot of a user interface 120 displaying options for the selection of different types of virtual reality training sessions according to an exemplary embodiment. In operation, a user may select a training module for an operating procedure. Selection of the training module triggers the system to generate the virtual environment. The following disclosure will describe training in a virtual environment based on the selection of an oil and gas module.

Each of the training modules may be designed to replicate the same environment in which a person will actually be trained. Globally Unique Identifiers (GUIDs) for virtual objects in the simulated environments may be generated at design-time, the details of which may be stored in a markup XML file. The file may be used to create components that can be attached to actors in 3D engines such as EON, Unreal and Unity, thereby allowing 3D engines to access the logically equivalent virtual objects and retrieve the consistent information (e.g. display name, xAPI data, descriptions etc.) from the objects regardless of the 3D engine used. This also overcomes the issue where certain 3D engines (for example Unreal) renames objects when re-importing or replacing 3D assets. Thus, the virtual objects in the training environment are reliably linked with components inside the learning management system.

Figure 6:
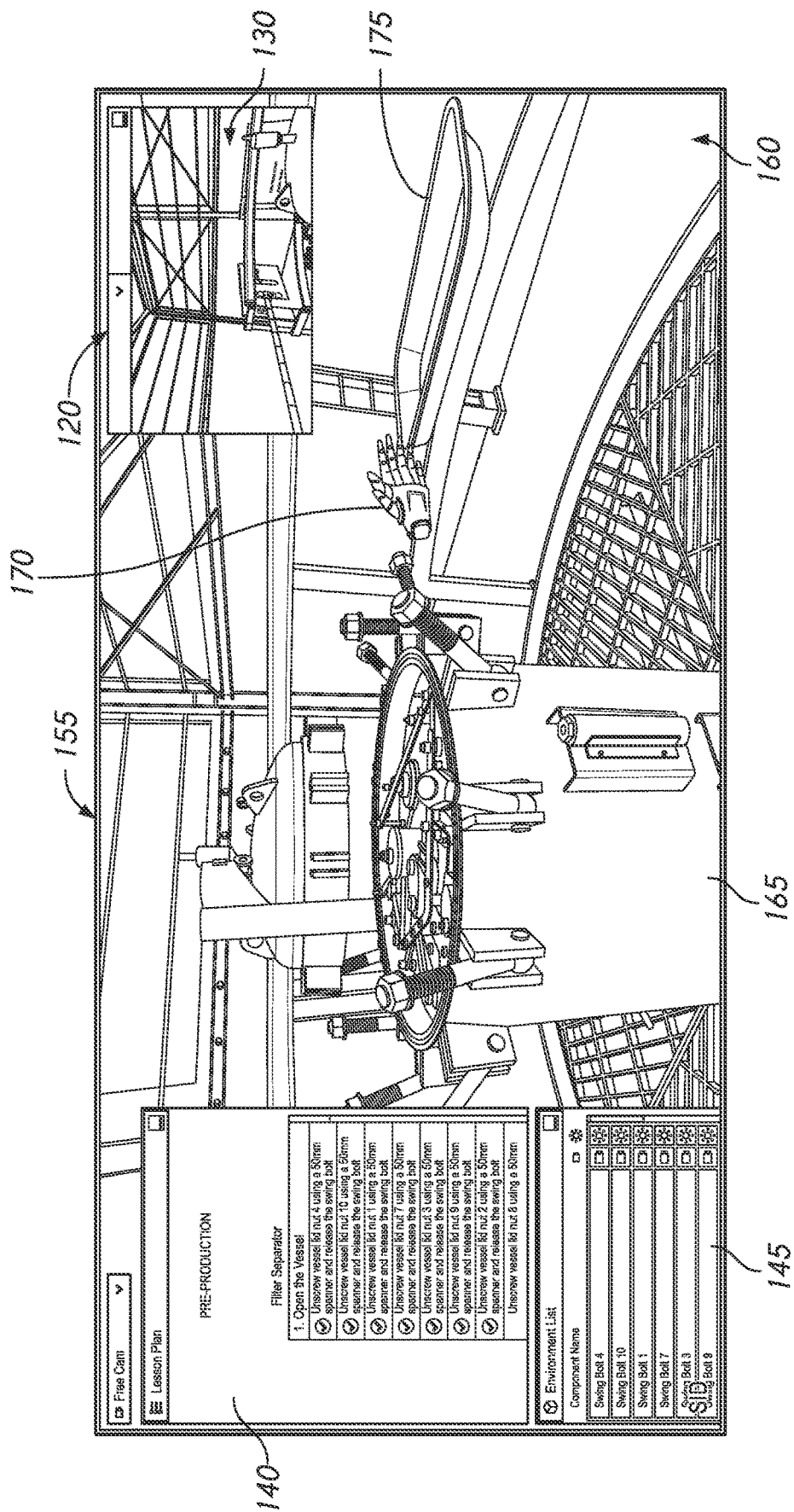
FIG. 6 is a screenshot of a user interface displaying a virtual reality training module of a simulated training environment from the perspective of a trainer with a simultaneous display of a trainee's perspective inset within a corner of the user interface in accordance with an exemplary embodiment.

FIG. 6 for example, shows a user interface 155 of the virtual training application with a simulated virtual environment 160. A replica of the same virtual scene from the trainee user's point of view may be visible to the trainer, which is shown as an inset in the upper right corner 120 with the simulated environment 130 embedded inside the trainer user's user interface 155. In some embodiments, the trainer may see the inset of UI 120 which may be used to monitor and help direct the trainee's attention to the correct location he or she should be looking at. The simulated environment 160 includes a plurality of virtual objects. The virtual objects shown in FIG. 6 simulate oil and gas processing equipment. The screen output 155 is from the trainer's perspective showing an example training scenario for servicing a particular vessel 165 at an oil and gas facility. The left-hand panel 140 may list detailed step by step procedures for the trainer to guide the trainee, and the bottom panel 145 may include a list of components referenced in each step for the trainer to highlight, with the ability to direct the trainee's view toward any specific component. To perform the training procedures, the trainee may use a hand-held controller 195 (FIG. 2) tracked in real-time by the VR module 110. The hand-held controller 195 may be shown as a virtual cursor 170 inside the virtual environment, which may resemble a virtual hand touching a virtual object 175 (which in this example, is an oil pan). With an optional hand tracking module as part of the VR module 110, the trainee's hand may be tracked in real-time and shown as a virtual hand. The trainee may direct the virtual hand touching a virtual object 175. In response, the virtual object 175 may be highlighted, for example by drawing a distinguishable outline along the perimeter of the object. As will be understood, the object 175 cannot be shown as highlighted because of patent drawing rules. The virtual object 175 may be manipulated by the trainee user following the virtual cursor 170 as if the user is being trained inside a real-world environment.

Figure 7:
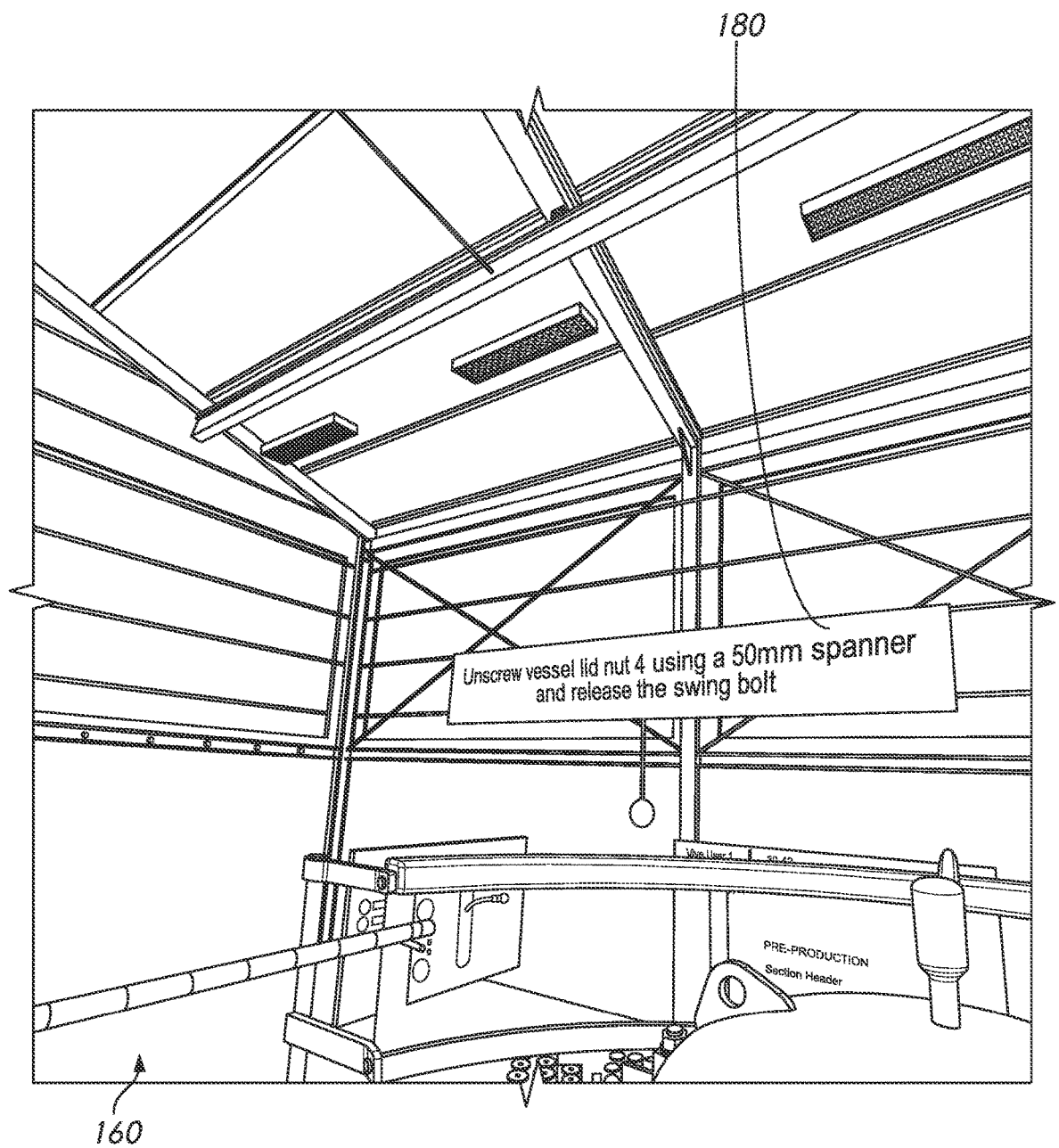
FIG. 7 is a screenshot of a user interface displaying a virtual reality simulated training environment from the perspective of a trainee with a pop-up window triggered in response to a user selected element in the simulated environment in accordance with an exemplary embodiment.

FIG. 7 shows another example of a GUID tagged virtual object. The screen output seen displays the trainee's perspective of the simulated virtual environment 160. Each lesson may be broken down into a series of individual tasks. Each task may involve a single interactive step with the model and includes completion criteria. One particular step in a service procedure is shown to the trainee in pop-up window form 180, with a line/arrow connecting the on-screen text to the corresponding 3D component inside the virtual environment. This helps the trainee visually identify what the next step in a procedure may mean and makes the completion criteria easier to understand.

Figure 8:
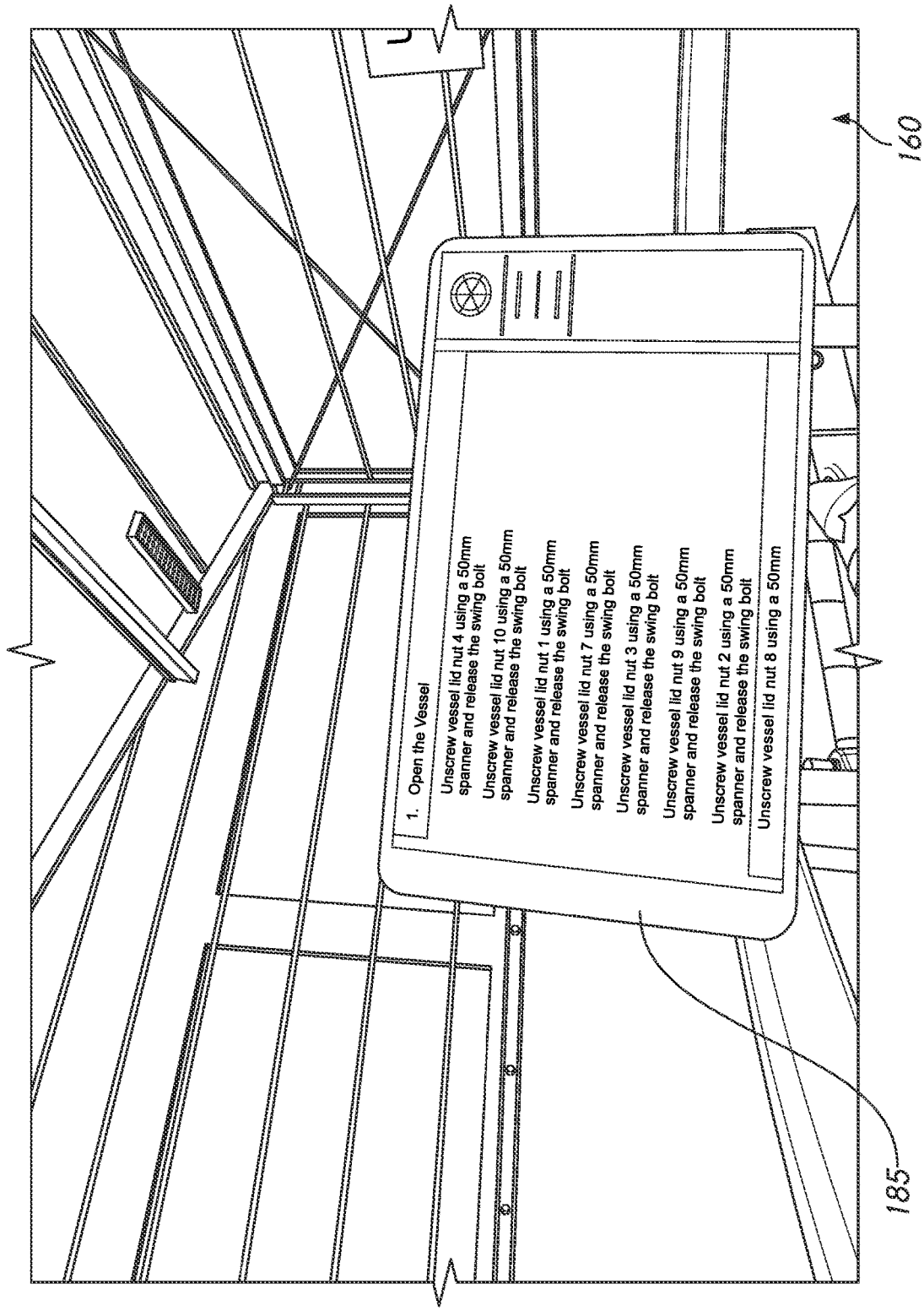
FIG. 8 is a screenshot of a user interface displaying a virtual reality simulated training environment from the perspective of a trainee with a virtual training manual triggered in response to a user selected element in the simulated environment in accordance with an exemplary embodiment.

FIG. 8 shows an example of another GUID tagged virtual object. A virtual screen 185, may be in the form of a tablet, has been designed for the user to hold inside the simulated virtual environment 160. The virtual screen 185 provides instructions, settings and controls of the training session, and also functions as a communication tool between the trainer and trainee. For example, the trainer can push content (web page, documentation, etc.) from the trainer's computing device 190 (FIG. 2) remotely onto the virtual screen 185 for the trainee to follow.

Referring back to FIG. 4, the trainer module 310 may also include features which may trigger 340 jumps in training steps and changes in training states, which may allow the user to control the simulated environment and procedure by moving between different points of training, provide 330 help to the trainee (for example, by offering hands-on demonstration to the trainee), and establish 345 two-way voice and/or video communication with the trainee.

The trainee module 355 may include features which allow the trainee to request 360 the trainer's help, switch 365 to the trainer's first-person view (for example, when watching the trainer demonstrate procedure in connection with feature 330), jump 370 to a selected training step and change training state, and establish 375 two-way communication with the trainer.

The spectator module 380 may include features which allow the spectator to switch 385 to either a first-person or third-person view of the trainer or the trainee, and to join 390 in on the voice and/or video communication between the trainer and the trainee.

As shown in FIG. 9, a virtual, remotely administered training session 400 is shown according to an exemplary embodiment. The session 400 may include a trainee user "U" in a first physical location 405 and the trainer user "T" in a second physical location 420 which may be remote from the trainee. A trainee user may wear an AR device 410 for example, a pair of AR glasses. The AR device 410 may establish real-time 6 Degrees-of-Freedom (6-DoF) tracking of the position and orientation of itself relative to the physical world. The AR device 410 may employ an object identification algorithm to keep track of the position and orientation of one or more physical objects in the environment. By doing so, information in the form of digital notes may be seen inside the AR device 410 as coupled to and/or superimposed on top of a physical object inside the physical environment. The trainee user wearing the AR device 410 may directly interact with physical objects in his/her environment. In the embodiment shown, the trainee is learning about repairing a vehicle 430. The vehicle 430 is a real-life object.

A trainer user may wear a VR headset 110 fully immersed inside a VR environment which may replicate the AR environment as seen by the trainee. The trainer user may connect to the trainee's session via the backend server 150 (FIG. 1) through for example, the computing device 190 which may be connected to a network that has access to the VR headset 110. By doing so the trainer user may see a digital replica of the same objects that the trainee user sees in the physical environment. The trainer user may interact with the digital replica via either a hand-held controller 195 (connected to the VR device 110) or his/her hand. The trainer user within the training session may show the trainee user how to perform a particular task by sharing information in the form of digital notes associated with the digital replica of a physical object inside a VR environment. The trainee user may see digital notes coupled to and/or superimposed on top of the physical counterpart (for example, in the form of a pop-up window 450), and may directly interact with the physical counterpart following the digital note provided by the trainer user as guidance for the trainee. Steps in the digital notes may be visible to the trainee as numbered labels (for example, "1", "2", "3") displayed in the trainee's AR view as pointing to each object that needs to be interacted with in sequence. The trainee user's view of the real-world environment may be captured via a video camera module on the AR device 410 and transmitted in real-time to the trainer user. The image of digital notes which may only be visible to the trainee from inside the AR device 410 may also be transmitted in real-time along with the video stream. As a result, the trainer user may see exactly what the trainee user sees through the AR device 410, a recomposed image with digital notes superimposed on top of the real-world environment. The trainee user and the trainer user may engage in two-way voice communication.

Figure 10:
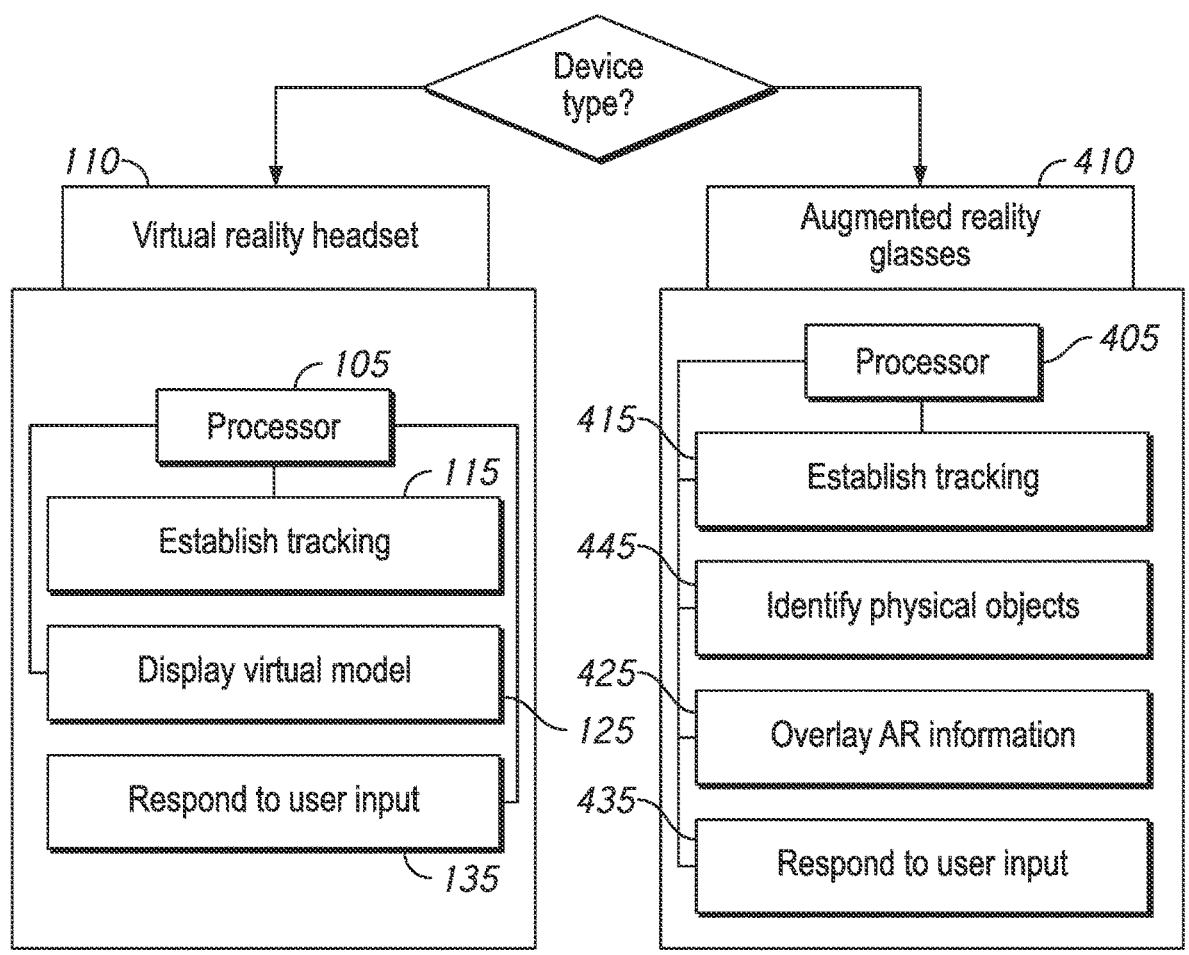
FIG. 10 is a block diagram of a virtual reality device and of an augmented reality device in accordance with an exemplary embodiment.

Referring now to FIG. 10, block diagrams representing a VR device 110 and an AR device 410 are shown according to exemplary embodiments. As mentioned previously, depending on the type of training, a user may be operating one type of device or the other. In a fully immersed scenario, a user may operate a VR device 110. When interacting with physical objects, the user may operate an AR device 410.

The VR device 110 may be a headset or other type of device which may generally block the ambient environment from the user's view. The VR device 110 may include a processor 105 coordinating the primary functions of the device between one or more modules to generate a VR environment. The VR device 110 may include a tracking module 115 configured to track the movement of the user (or his/her "hands" for controlling purposes) in a VR environment. The VR device 110 may also include a virtual model display module 125 configured to generate the virtual environment experienced by the user. A user input module 135 may provide triggered selections by the user for the processor 105 to use in generating an action. Some user input may be transmitted through a network to for example the server 150 (FIG. 1).

The AR device 410 may include a processor 405 coordinating the primary functions of the device between one or more modules to generate an AR environment. The AR device 410 may include a tracking module 415 (which may be similar to the tracking module 115) and a user input module 435 (which may be similar to the user input module 135). The AR device 410 may include a physical object identification module 445 which may be configured to detect physical objects proximate the device. The location of physical objects may be coordinated with virtual objects in generating the virtual scene. The AR device 410 may include an overlay module 425 configured to coordinate the overlay of virtual objects over physical or other virtual objects.

While the VR module and AR module may provide more immersion and intuitive manipulation of the virtual objects, the user, typically as a trainer, may opt for a desktop computer for comfortability conducting training sessions over a long period of time. The users, both the trainer and the trainee, may also opt for hand-held devices such as a mobile phone or tablet, in preference of portability in order to conduct the training sessions while mobile. The type of device is interchangeable without affecting the functionalities of the training application in general.

Figure 11:
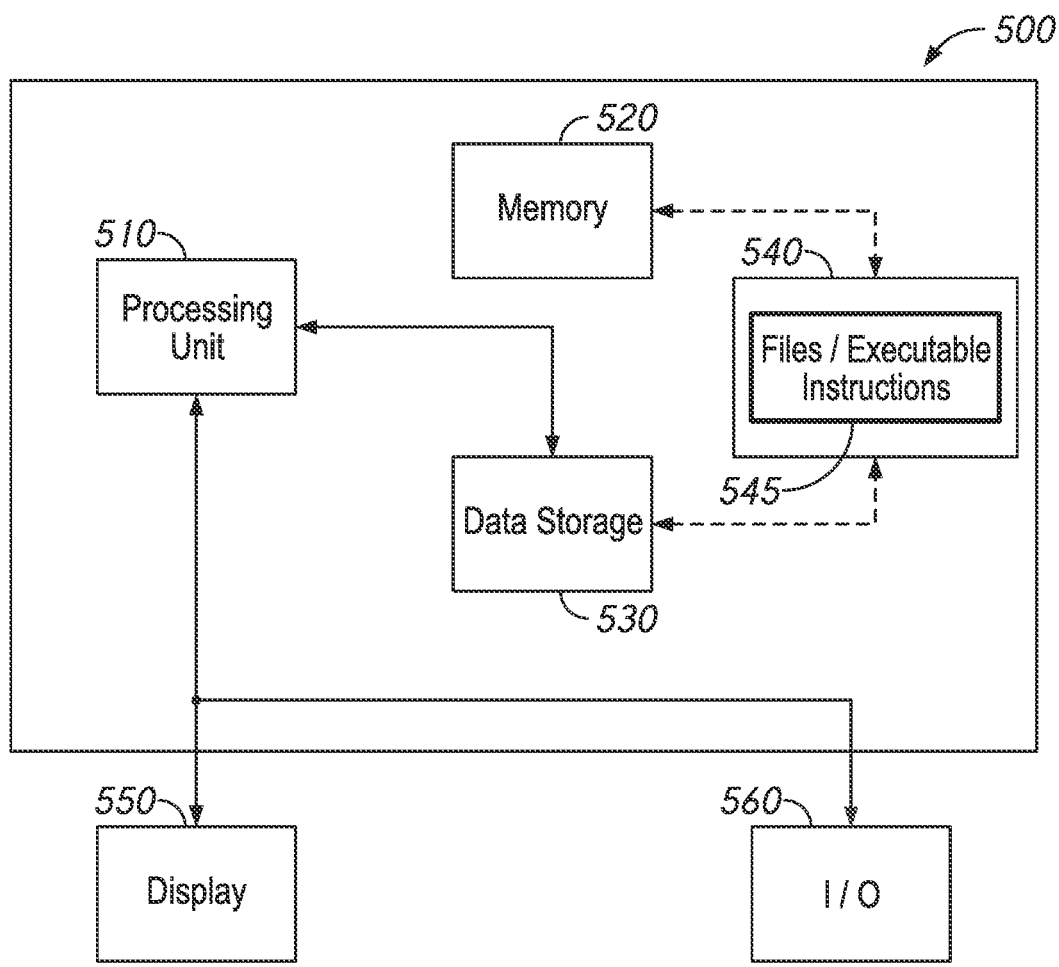
FIG. 11 is a block diagram of a computing device in accordance with an exemplary embodiment.

Referring now to FIG. 11, a schematic of an example of a computing device 500 is shown. The computing device 500 may be for example, a computer system, a computer server, or a computing-based image processing and rendering device. In the disclosure above, the computing device may represent for example, the trainer's computing device 190 or the server device(s) 150. As will be appreciated, some aspects of the embodiments disclosed above may turn the computing device 500 into a special purpose computer system. For example, in the role of a host server 150, the computing device 500 may implement for example the functions of storing electronic files with connected users and their respective VR/AR devices. More particular to this disclosure, as a host server 150, the computing device 500 may receive and store copies of software modules and coordinate the transmission of VR environments and changes to those environments based on user actions within those environments. The computing device 500, as a host server may also store the progress of a trainee user through a training module. In the role of a user device, the computing device 500 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics. In some embodiments, the VR device 110 and the AR device 410 may be wearable devices within the scope of the computing device 500.

The components of the computing device 500, may include, but are not limited to, one or more processors or processing units 510, a system memory 520, data storage 530, a computer program product 540 having a set of program modules 545 including files and executable instructions, and a bus system that couples various system components including the system memory 520 to the processor(s) 510. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications (like those related to generating virtual and augmented reality scenes) either alone or in coordination with other general processor 510 types such a CPUs, microchips, and the like.

The computing device 500 may be described in the general context of computer system executable instructions, such as the program modules 545 which represent a software embodiment of the system and processes described generally above with respect to FIGS. 3-4. The program modules 545 generally carry out the functions and/or methodologies of embodiments as described above. As such, while not described in detail, the software modules generally referred to above may be understood to be one example of program modules 545. The computing device 500 may typically include a variety of computer system readable media. Such media could be chosen from any available media that is accessible by the computing device 500, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 520 could include one or more computer system readable media in the form of volatile memory, such as a random-access memory (RAM) and/or a cache memory. By way of example only, the data storage system 530 may read from and write to a non-removable, non-volatile magnetic media device. The system memory 520 may include at least one program product 540 having a set (e.g., at least one) of program modules 545 that are configured to carry out the functions of embodiments of the invention in the form of computer executable instructions. The program product/utility 540, having a set (at least one) of program modules 545, may be stored in the system memory 520 by way of example, and not limitation, as an operating system, one or more application programs, other program modules, and program data.

The computing device 500 may communicate with one or more external devices including for example, an electronic display 550 which may in some embodiments be configured for tactile response as in a touch screen display. User input into the display 550 may be registered at the processor 510 and processed accordingly. Other devices may enable the computing device 500 to communicate with one or more other computing devices, either by hardwire or wirelessly. Such communication can occur via Input/output (I/O) interfaces/ports 560. In some embodiments, the I/O interfaces/ports 560 may be specially configured to handle aspects of the embodiments described herein converting the computing device 500 into a special purpose machine. For example, as a VR or AR display device, the I/O interfaces/ports 560 may be configured to transmit receipt of the image data in its converted virtual data format.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Having discussed the overall processes of embodiments, the following is a disclosure of various specific features which may be implemented into one or more embodiments but which may not be viewed in or illustratable by the drawings.

LMS-VR-Enterprise-Systems-XAPI-LRS-LMS Cycle

Through for example the use of Sharable Content Object Reference Model (SCORM) packages, the VR application may be launched via a client's Learning Management System (LMS). This enables the application to be presented alongside associated learning material, becoming part of the larger knowledge transfer cycle. On launch, user credentials may be passed to the application and can then be added to xAPI statements that are generated as a result of the learner's interactions with the virtual environment. This xAPI statements are then sent to a Learning Record Store (LRS). Through further integration work the system may communicate with other pre-existing client IT systems.

Session Health Monitoring & Load Balancing

In another aspect, the embodiments benefit from other solutions including for example, session health monitoring and load balancing. In practice, a company may be training many instances simultaneously. Some aspects enable sending/retrieving of information on overall system health and usage, including: the number of running sessions, users in sessions, network load, CPU load, failed/unresponsive/unused sessions, setting spare system capacity, expansion thresholds (when to start new hardware servers to handle more sessions), expansion limits (maximum number of sessions per hardware server and maximum number of hardware servers etc.)

The overall system may allow the session health system to limit the creation of extra sessions on a virtual machine if that machine is being heavily used, and to "spin-up" additional virtual machines to handle extra load if new sessions are required. The scale of the system can be made to expand automatically depending on performance and load requirements.

Remote First Person and Third Person Views

As disclosed previously, it should be appreciated that embodiments allow for multiple users in the same virtual session to each be able to switch between first- and third-person views. For example, the trainer may switch to a first-person view which directly shows what the trainee sees from his/her perspective, as if seeing through trainee's eyes. This not only allows the trainer to observe the training session more closely, but trainer may also pick up additional cues from the process. For example, trainer sees which gauge/indicator the trainee is paying attention to, and it could be an irrelevant object that attracted the trainee's attention. Or the trainer observes the trainee not paying enough attention to a certain gauge/indicator, which may lead to potential failure at a later stage. The trainer may also switch to a third person spectator view that offers clear observation of the training session, for example a bird's eye view, which provides a broader field of view.

Generating xAPI Statements from XML & Process of SoP into Lesson Plan

XSLT (XML stylesheets) may be used to convert an XML file into a series of xAPI conforming .JSON statements. The conversion may turn a standard operating procedure document into a series of tasks with appropriate VR interactions with components of the model. This process results in the information required to ultimately generate xAPI statements for each task/interaction. As will be appreciated, this aspect converts each virtual object's GUID (model ID tag) shown in the XML snippet to a different JSON format so that the xAPI protocol can understand and each step be correctly recorded by the LMS system. The following is a snippet of an example XML file that outlines one particular task of a training procedure.

```
<!--Task 12-->
<task id='12' stageindex='5'>
    <display languagecode='en-GB'>Install XZV-4716 Outlet to ZV-8521 Inlet bypass</display>
    <verb>
        <id>http://www.eonreality.com/verbs#installed</id>
        <display languagecode='en-GB'>installed</display>
    </verb>
    <object>
        <id>http://www.eonreality.com/objects#xzv4716outlet</id>
        <modelid>5C4BBFEA-4710-4F40-9D76-4C02345E6024</modelid>
        <modelname>OutletAccessArea</modelname>
        <unitname>AccessDoor_37647</unitname>
        <definition>
            <name languagecode='en-GB'>XZV-4716 Outlet</name>
            <description languagecode='en-GB'>XZV-4716 Outlet</description>
        </definition>
        <type>http://adlnet.gov/expapi/activities/cmi.interaction</type>
    </object>
    <tool>
        <modelid>06AEF649-D1F3-4685-914C-F80D7CB14A43</modelid>
        <modelname>Wrench</modelname>
        <definition>
            <name languagecode='en-GB'>Wrench</name>
            <description languagecode='en-GB'>Wrench</description>
        </definition>
    </tool>
```

```
    <audiofile languagecode='en-GB'>InstallXZV-4716OutletToZV-8521InletBypass_MP3</audiofile>
  </task>
<!--Task 13-->
<task id='13' stageindex='5'>
    <display languagecode='en-GB'>Close outlet access door</display>
    <verb>
        <id>http://www.eonreality.com/verbs#closed</id>
        <display languagecode='en-GB'>closed</display>
    </verb>
```

User Completion Criteria—Success, Mistakes as Part of XML File

Possible paths to complete a lesson, including error, warning and success criteria may be encoded in the lesson XML file. These valuable training logs may be fed into artificial intelligence and data mining algorithms to further analyze the training results. The training session may be adapted to each particular user based on the information analyzed from training logs for better training experiences, for example by providing additional instructions of a step that the trainee failed in the past, or skip certain instructions where the trainee performs really well.

Lesson Creation Showing Models in 3D in Course Editor

XML files generated at design-time may be used to provide information on virtual objects, including display information, GUIDs and available object settings, to generate a lesson plan via a three-dimensional rendering of the relevant objects and environment. The lesson creation or editing process may also be done in real-time. The XML may be updated or edited by the lesson creator, and the corresponding virtual objects and associated training step(s) may be updated instantly to reflect the changes. Thus, the user may have the ability to do a live preview of the lesson being created or modified.

Internal Communications Hooked Up to External Tools Like Skype, Cisco Etc.

Some embodiments include compatibility with third party applications including existing enterprise systems. For example, some embodiments may include modules to setup and use a selection of communication systems from within the VR simulation, for example: Skype for Business, TeamSpeak and any systems built into the relevant 3D engine and training system.

Lesson Step Jumping and State Changing

As previously mentioned, the remote trainer and trainee may progress through a lesson or lessons by clicking on the task to which they want to jump to. This may be achieved via the UI function within the simulation in the trainee's view or a UI function in the trainer's view. Stepping through lesson tasks causes the virtual environment to reflect the state of the lesson up to the task selected. For example, marking an oil pan removal task as completed will cause the appropriate oil pan be removed in the virtual environment. This end result may be replicated to all participants (trainer, trainee, or observer). As will be appreciated, this allows tasks to be re-attempted if necessary, to aid understanding, and to skip tricky or skip through well-understood tasks, allowing trainee to focus on more important parts of the lesson.

Multi User/Viewport Setup

In some embodiments, the trainer or observer may display the real-time view of any connected VR user, switching freely between them, and even show multiple views at the same time without sacrificing their own free-roaming view of the environment. As will be appreciated, the trainer may thus oversee multiple trainees simultaneously. In addition, this provides the trainer with a comparative perspective of trainees performing the same training module.

Should a trainer ever lose his/her connection during a training session (due to for example network failures, power failures or training app premature terminations), the session will continue without any loss of functionality for other session members. The trainer can re-join the session when they regain connectivity. This is achieved by both trainer and trainee keeping track of the current training session, so one user is not dependent on the other party and is able to continue the training sessions independently. The training application, thus, does not completely depend on the server 150 being up and running. While both users may have access to view the same simulated environment in which the trainee is currently engaged, each respective user's session may be an individual session, independent of the other user's session connection.

Solution for Trainer-Less Training

Accordingly, embodiments that include independent user session connections in the guided mode as previously described, may provide the user guidance through a series of tasks without the need of a trainer. By using a range of text and audio- or video-based instruction and a 'Virtual Tablet' that the user can refer to during a lesson, the user may self-train if desired. For example, the virtual screen 185 shown in FIG. 8 may be a virtual tablet with which a user may interact with during a session to access data without having to leave the virtual environment.

Virtual Screen as User Interface for Communications and Controls

The user may step out and later resume the training session and may even switch to a different device if desired. For example, a trainee may start his training session at the training center using a head mounted display such as HTC VIVE or Oculus Rift. If the user must leave the session before finishing it, he may continue the session using his mobile phone while on his way to the worksite. The system automatically saves the training progress that is associated with the user profile and picks up the training session where it was left off.

As will be appreciated by one skilled in the art, aspects of the disclosed embodiments may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In some embodiments, a computer program product may be stored on a variety of computer system readable media. Such media could be chosen from any available media that is accessible by the processor, including non-transitory, volatile and non-volatile media, removable and non-removable media. Some embodiments may include system memory integrated into the PCB carrying the processor, which could include one or more computer system readable media in the form of volatile memory, such as a random-access memory (RAM) and/or a cache memory. The system memory may include at least one program product having a set (e.g., at least one) of program modules that are configured to carry out the functions of embodiments disclosed above. The program modules generally carry out the functions and/or methodologies of embodiments described above.

Although the invention has been discussed with reference to specific embodiments, it is apparent and should be understood that the concept can be otherwise embodied to achieve the advantages discussed. The preferred embodiments above have been described primarily as immersive virtual reality systems and methods for a larger number of concurrent users. In this regard, the foregoing descriptions of the virtual reality environments are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A system for multi-user virtual reality (VR) remote training, comprising:
    a server computer configured to:
        convert training material files into digital files;
        generate a three-dimensional model of a working environment based on the digital files converted from training materials;
        generate an immersed VR simulated environment based on the three-dimensional model of the working environment in response to a selection of a stored VR training module, and
        coordinate changes in the VR simulated environment in response to user actions of a first user in the VR simulated environment,
        track the user actions of the first user as changes are made to the VR simulated environment, as the first user performs a training procedure,
        assess a performance of the first user based on the tracked user actions, and
        determine a performance score of the first user for the training procedure;
    a VR device in communication with the server computer, wherein the generated VR simulated environment is displayed to the first user through the VR device; and
    a computing device in communication with the computer server, wherein:
        a second user is connectable, through the computing device, to a session displaying the first user in the generated VR simulated environment,
        the coordinated changes in the VR simulated environment are displayed to the second user in an exact duplicate of the VR simulated environment as viewed by the first user,
        the second user is enabled to switch between a third person perspective view of the VR simulated environment watching the first user to a first-person perspective view of the VR simulated environment, as viewable by the first user, and
        a selectable function is accessible by the second user, wherein the selectable function is operable to position a view of the first user, by the second user, in front of an object in the VR simulated environment.

2. The system of claim 1, wherein the VR training module is configured to include selectable segments of a training procedure, and wherein the computer server is configured to enable either the first user or the second user to replay, pause, or forward through the selectable segments of the training procedure while the first user is training within the VR simulated environment.

3. The system of claim 2, wherein the computer server is configured to enable either the first user or the second user to directly select a point in the training procedure for the first user to train a task at the point in the training procedure.

4. The system of claim 3, the computer server is configured to display the VR simulated environment at the selected point in the training procedure as if previous tasks in the training procedure were successfully performed.

5. The system of claim 1, wherein the computer server is configured to enable a help function in the VR simulated environment configured to request from the first user, help of the second user, triggering a switch to a first-person perspective view of the second user, viewable by the first user, and enabling the second user to perform an action in the VR simulated environment.

6. The system of claim 1, wherein the computer server is configured to enable a function highlighting an object in the VR simulated environment to be used for a next step in the in response to the first user requesting help or completing a previous task in a training procedure.

7. The system of claim 1, wherein the computer server is configured to generate a virtual object in the VR simulated environment, wherein:
    the virtual object is superimposed on top of a real object in a physical environment; and the physical environment is visible through the VR simulated environment.

8. A computer program product for multi-user virtual reality (VR) remote training, the computer program product comprising a non-transitory computer readable storage medium having computer readable program code embodied therewith, the computer readable program code being configured, when executed by a computer processor, to:
convert training material files into digital files;
generate a three-dimensional model of a working environment based on the digital files converted from training materials;
generate an immersed VR simulated environment based on the three-dimensional model of the working environment in response to a selection of a stored VR training module, wherein the stored VR training module includes virtual objects and stored operating procedures related to the virtual objects;
coordinate changes in the VR simulated environment in response to user actions of a first user in the VR simulated environment;
track the user actions of the first user as changes are made to the VR simulated environment, as the first user performs a training procedure;
assess a performance of the first user based on the tracked user actions;
determine a performance score of the first user for the training procedure;
display to a first user through a VR device, the generated VR simulated environment;
display the first user in the generated VR simulated environment to a second user joining a session of the VR simulated environment through a computing device, wherein the coordinated changes in the VR simulated environment are displayed to the second user in an exact duplicate of the VR simulated environment as viewed by the first user;
enable, for the second user, switching between a third person perspective view of the VR simulated environment watching the first user to a first-person perspective view of the VR simulated environment, as viewable by the first user; and
provide a selectable function accessible by the second user, wherein the selectable function is operable to position a view of the first user, by the second user, in front of an object in the VR simulated environment.

9. The computer program product of claim 8, further comprising computer readable program code configured to:
include selectable segments of a training procedure in the generated VR training module, and
enable either the first user or the second user to replay, pause, or forward through the selectable segments of the training procedure while the first user is training within the VR simulated environment.

10. The computer program product of claim 9, further comprising computer readable program code configured to:
enable either the first user or the second user to directly select a point in the training procedure for the first user to train a task at the point in the training procedure.

11. The computer program product of claim 10, further comprising computer readable program code configured to:
display the VR simulated environment at the selected point in the training procedure as if previous tasks in the training procedure were successfully performed.

12. The computer program product of claim 8, further comprising computer readable program code configured to:
enable a help function in the VR simulated environment configured to request from the first user, help of the second user;
trigger a switch to a first-person perspective view of the second user, viewable by the first user; and
enable the second user to perform an action in the VR simulated environment.

13. The computer program product of claim 8, further comprising computer readable program code configured to:
enable a function highlighting an object in the VR simulated environment to be used for a next step in the in response to the first user requesting help or completing a previous task in a training procedure.

14. The computer program product of claim 8, further comprising computer readable program code configured to:
generate a virtual object in the VR simulated environment, wherein:
the virtual object is superimposed on top of a real object in a physical environment; and
the physical environment is visible through the VR simulated environment.

15. A method of providing a multi-user virtual reality (VR) remote training session, comprising:
converting training material files into digital files;
generating a three-dimensional model of a working environment based on the digital files converted from training materials;
generating an immersed VR simulated environment based on the three-dimensional model of the working environment in response to a selection of a stored VR training module, wherein the stored VR training module includes virtual objects and stored operating procedures related to the virtual objects;
coordinating changes in the VR simulated environment in response to user actions of a first user in the VR simulated environment;
tracking the user actions of the first user as changes are made to the VR simulated environment, as the first user performs a training procedure;
assessing a performance of the first user based on the tracked user actions;
determining a performance score of the first user for the training procedure;
displaying to a first user through a VR device, the generated VR simulated environment;
displaying the first user in the generated VR simulated environment to a second user joining a session of the VR simulated environment through a computing device, wherein the coordinated changes in the VR simulated environment are displayed to the second user in an exact duplicate of the VR simulated environment as viewed by the first user;
enabling, for the second user, switching between a third person perspective view of the VR simulated environment watching the first user to a first-person perspective view of the VR simulated environment, as viewable by the first user; and
generating a selectable function, accessible by the second user, wherein the selectable function is operable to position a view of the first user, by the second user, in front of an object.

16. The method of claim 15, further comprising:
including selectable segments of a training procedure in the generated VR training module, and
enabling either the first user or the second user to replay, pause, or forward through the selectable segments of the training procedure while the first user is training within the VR simulated environment.

17. The method of claim 16, further comprising:
enabling either the first user or the second user to directly select a point in the training procedure for the first user to train a task at the point in the training procedure.

18. The method of claim 17, further comprising:
displaying the VR simulated environment at the selected point in the training procedure as if previous tasks in the training procedure were successfully performed.

19. The method of claim 15, further comprising:
enabling a help function in the VR simulated environment configured to request from the first user, help of the second user;
triggering a switch to a first-person perspective view of the second user, viewable by the first user; and
enabling the second user to perform an action in the VR simulated environment.

20. The method of claim 15, further comprising:
generating a virtual object in the VR simulated environment, wherein:
the virtual object is superimposed on top of a real object in a physical environment; and
the physical environment is visible through the VR simulated environment.

\* \* \* \* \*